(12) United States Patent
Kumar et al.

(10) Patent No.: US 12,386,957 B2
(45) Date of Patent: Aug. 12, 2025

(54) PRIORITIZED VIRUS SCANNING OF FILES BASED ON FILE SIZE

(71) Applicant: Dell Products L.P., Round Rock, TX (US)

(72) Inventors: Shiv S. Kumar, Pune (IN); Kaushik Gupta, Pune (IN)

(73) Assignee: Dell Products L.P., Round Rock, TX (US)

( * ) Notice: Subject to any disclaimer, the term of this patent is extended or adjusted under 35 U.S.C. 154(b) by 168 days.

(21) Appl. No.: 18/458,020

(22) Filed: Aug. 29, 2023

(65) Prior Publication Data
US 2025/0077667 A1   Mar. 6, 2025

(51) Int. Cl.
*G06F 21/56*   (2013.01)

(52) U.S. Cl.
CPC .......... *G06F 21/564* (2013.01); *G06F 21/565* (2013.01); *G06F 2221/034* (2013.01)

(58) Field of Classification Search
None
See application file for complete search history.

(56) References Cited

U.S. PATENT DOCUMENTS

| | | | |
|---|---|---|---|
| 9,436,824 B1* | 9/2016 | Levchenko | G06F 21/56 |
| 2021/0099465 A1* | 4/2021 | Timashev | H04L 63/145 |

* cited by examiner

*Primary Examiner* — Brian F Shaw
(74) *Attorney, Agent, or Firm* — Amin, Turocy & Watson, LLP

(57) ABSTRACT

A system can maintain, in a directory, respective first softlinks of respective first files that have a size within a specified range, and that have been modified subsequent to a respective most-recent virus scan. The system can, in response to determining to perform an antivirus scan on a group of files that comprises the first files, perform a first antivirus scan on the first files based on identifying the first softlinks in the directory, and, after performing the first antivirus scan on the first files, perform a second antivirus scan on second files of the group of files that are not identified with respective second softlinks in the directory.

20 Claims, 11 Drawing Sheets

400

(402)

↓

DETERMINING THAT A FILE OPERATION WAS PERFORMED ON A FILE 404

↓

DETERMINING THAT THERE IS NOT A SOFTLINK FOR THE FILE 406

↓

DETERMINING THAT THE FILE HAS A PRIORITY SIZE 408

↓

ADDING A SOFTLINK FOR THE FILE 410

DETERMINING THAT A FILE OPERATION WAS PERFORMED ON A FILE 504

↓

DETERMINING THAT THERE IS NOT A SOFTLINK FOR THE FILE 506

↓

DETERMINING THAT THE FILE DOES NOT HAVE A PRIORITY SIZE 508

↓

DETERMINING NOT TO ADD A SOFTLINK FOR THE FILE 510

DETERMINING THAT A FILE OPERATION WAS PERFORMED ON A FILE 604

↓

DETERMINING THAT THERE IS A SOFTLINK FOR THE FILE 606

↓

DETERMINING THAT THE FILE DOES NOT HAVE A PRIORITY SIZE 608

↓

REMOVING A SOFTLINK FOR THE FILE 610

MAINTAINING, IN A DIRECTORY, RESPECTIVE FIRST SOFTLINKS OF RESPECTIVE FIRST FILES THAT HAVE A SIZE WITHIN A SPECIFIED RANGE, AND THAT HAVE BEEN MODIFIED SUBSEQUENT TO A RESPECTIVE MOST-RECENT VIRUS SCAN 804

IN RESPONSE TO DETERMINING TO PERFORM AN ANTIVIRUS SCAN ON A GROUP OF FILES THAT COMPRISES THE FIRST FILES, PERFORMING A FIRST ANTIVIRUS SCAN ON THE FIRST FILES BASED ON IDENTIFYING THE FIRST SOFTLINKS IN THE DIRECTORY, AND AFTER PERFORMING THE FIRST ANTIVIRUS SCAN ON THE FIRST FILES, PERFORMING A SECOND ANTIVIRUS SCAN ON SECOND FILES OF THE GROUP OF FILES THAT ARE NOT IDENTIFIED WITH RESPECTIVE SECOND SOFTLINKS IN THE DIRECTORY 806

PRIORITIZED VIRUS SCANNING OF FILES BASED ON FILE SIZE

BACKGROUND

A computer virus can generally comprise computer-executable code stored within a file that, when executed, can cause the performance of malicious actions on a computer system. A file that comprises a virus can generally be referred to as an infected file, or a virus file. An antivirus scanner can identify infected files and mitigate against malicious actions associated with those files.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can maintain, in a directory, respective first softlinks of respective first files that have a size within a specified range, and that have been modified subsequent to a respective most-recent virus scan. The system can, in response to determining to perform an antivirus scan on a group of files that comprises the first files, perform a first antivirus scan on the first files based on identifying the first softlinks in the directory, and, after performing the first antivirus scan on the first files, perform a second antivirus scan on second files of the group of files that are not identified with respective second softlinks in the directory.

An example method can comprise effectuating, by a system comprising a processor, an antivirus scan on a first directory by effectuating a first antivirus scan on first files of the first directory based on identifying first softlinks in a second directory, wherein respective first softlinks of the first softlinks correspond to respective first files of a group of files in the first directory, and wherein respective file sizes of the respective first files are within a defined size range. The method can further comprise, after effectuating the first antivirus scan on the first files, effectuating the antivirus scan on the first directory by effectuating a second antivirus scan on second files of the group of files in the first directory that are not identified with respective second softlinks in the second directory.

An example non-transitory computer-readable medium can comprise instructions that, in response to execution, cause a system comprising a processor to perform operations. These operations can comprise performing an antivirus scan on a first directory by performing a first antivirus scan on first files of the first directory based on identifying first softlinks in a second directory, wherein respective first softlinks of the first softlinks correspond to respective first files of the first files. These operations can further comprise, after performing the first antivirus scan on the first files, performing a second antivirus scan on second files in the first directory that are not identified with respective second softlinks in the second directory.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which:

FIG. 4 illustrates an example process flow for processing a modified file that has a suitable file size and lacks a softlink, and that can facilitate prioritized virus scanning of files based on file size, in accordance with an embodiment of this disclosure;

FIG. 5 illustrates an example process flow for processing a modified file that has an unsuitable file size and lacks a softlink, and that can facilitate prioritized virus scanning of files based on file size, in accordance with an embodiment of this disclosure;

FIG. 6 illustrates an example process flow for processing a modified file that has an unsuitable file size and has a softlink, and that can facilitate prioritized virus scanning of files based on file size, in accordance with an embodiment of this disclosure;

FIG. 8 illustrates an example process flow that can facilitate prioritized virus scanning of files based on file size, in accordance with an embodiment of this disclosure;

DETAILED DESCRIPTION

Overview

Figure 1:
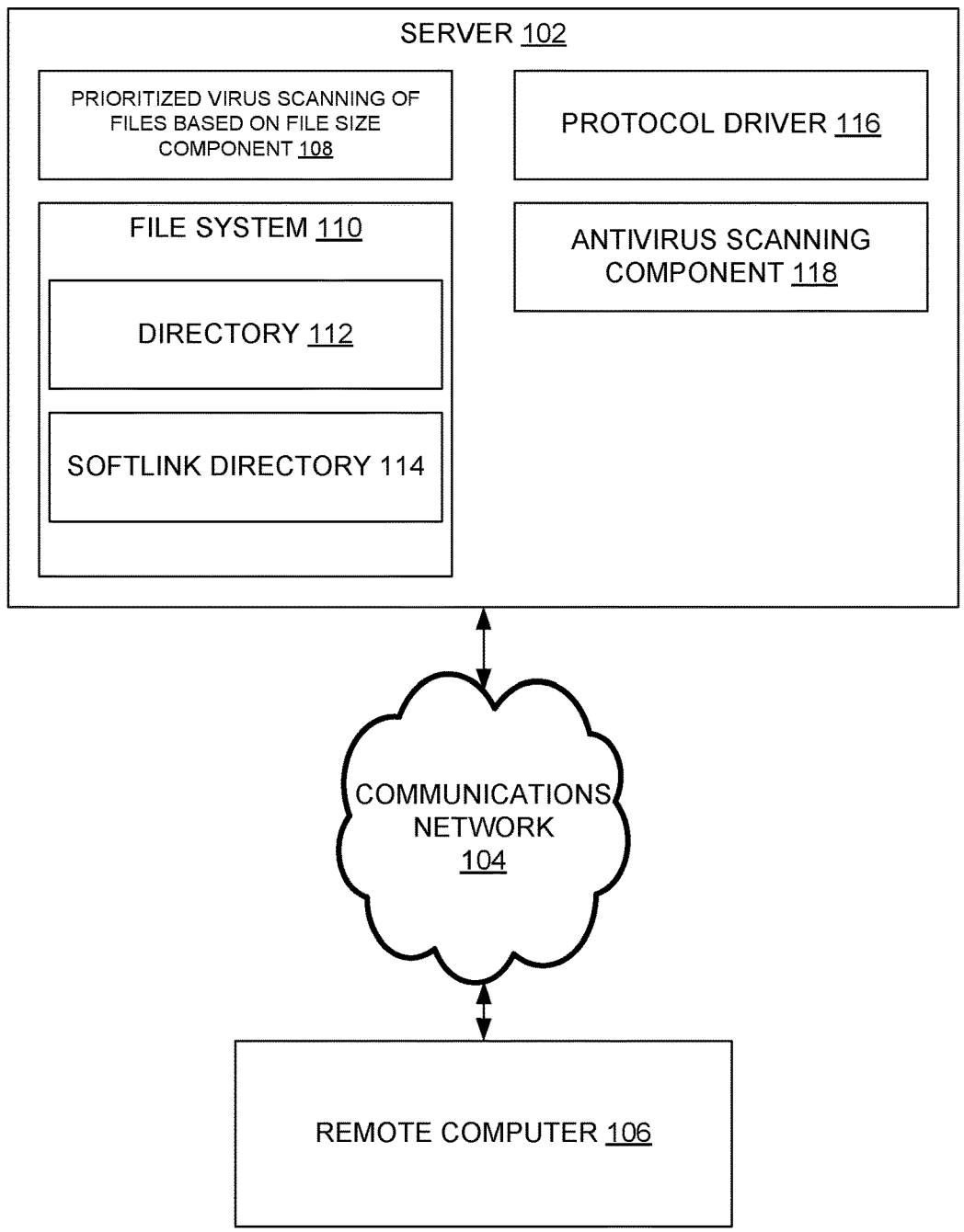
FIG. 1 illustrates an example system architecture that can facilitate prioritized virus scanning of files based on file size, in accordance with an embodiment of this disclosure.

The present techniques can be implemented to facilitate scanning possible virus files based on their priority, by identifying and maintaining a list of such files based on file size.

It can be that prior approaches lack a provision for an anti-virus (AV) job to fetch files of a specific size from a tree files (e.g., a million files) and scan them based on priority. However, it can be that different types of files are more, or less, likely to be infected. It can be that research has shown that virus files average less than 1 megabyte (MB) in size, with 30% of virus files being smaller than 200 kilobytes (KB) in size. A reason for this can be to facilitate quick execution of a virus as a file loads into memory before a user can realize that something is wrong.

It can be that, once a file is detected as being a virus file, other files infected with the same virus can have the same, or a similar, file size. Given that, it can make sense to prioritize scanning files that have a size that is the same, or similar, to a detected virus file.

According to the present techniques, files can be identified that are smaller than a particular size (e.g., 1 MB), or that are of a specific size range (e.g., as per a size of detected virus files), and a softlink of such files can be created in a particular directory (e.g., /<desired_path>/.priority-scan). A softlink can generally identify a file path (which can identify a file stored at that file path), and can be added or deleted without modifying a file that the softlink identifies.

In some examples, threshold values for a file size, or a value for a range of file sizes can be determined based on user input from an administrator. A system that implements the present techniques can be configured with a default file size value for priority scanning, and an antivirus scanner. In some examples, by default, a file size value can be set to that of well-known virus sizes.

An antivirus scanner (sometimes referred to as an AV engine) can first scan files identified in the priority scanning directory. Once a file is scanned, its softlink can be removed. A scan time of the file can be updated. This can result in the file's scan time being greater than its last-modified time. Given that, it can be that the file is not scanned again when the AV scanner scans non-priority files, such as by tree-walking a directory that has files that are to be scanned.

Creating a softlink for a priority file can be performed once a file-close operation for that file succeeds.

It can be that, when a modify-and-close file operation is received by a protocol driver that is configured to perform file system operations, a completion callback can perform the following. A stats operation (such as in a UNIX-type environment) can be performed on the file to determine its file size. If the file size is less than a threshold value or within a specific range, a softlink of the file can be created in the priority-scan directory.

Otherwise, if there is a softlink of the file, that softlink can be removed from the priority-scan directory. That is, the softlink could have been added when the file was an appropriate size; but now the file has been modified to have a size outside of the priority size values, so its softlink will be removed, as the file is no longer a priority for AV scanning. An example of this can be that priority files are those with a size of less than 1 MB, that the file was initially created having such as size, but now the file has been modified to have a size greater than 1 MB.

Where a file has an appropriate size and already has a corresponding softlink, it can be that no operation regarding the softlink is performed. Additionally, where the file has an inappropriate size and does not have a corresponding softlink, it can be that no operation regarding a softlink is performed.

In some examples, this can be effectuated through a work-queue infrastructure.

Example Architectures

FIG. 1 illustrates an example system architecture 100 that can facilitate prioritized virus scanning of files based on file size, in accordance with an embodiment of this disclosure.

System architecture 100 comprises server 102, communications network 104, and client computer 106. In turn, server 102 comprises prioritized virus scanning of files based on file size component 108, file system 110 (which comprises directory 112 and softlink directory 114), protocol driver 116, and antivirus scanning component 118.

Figure 10:
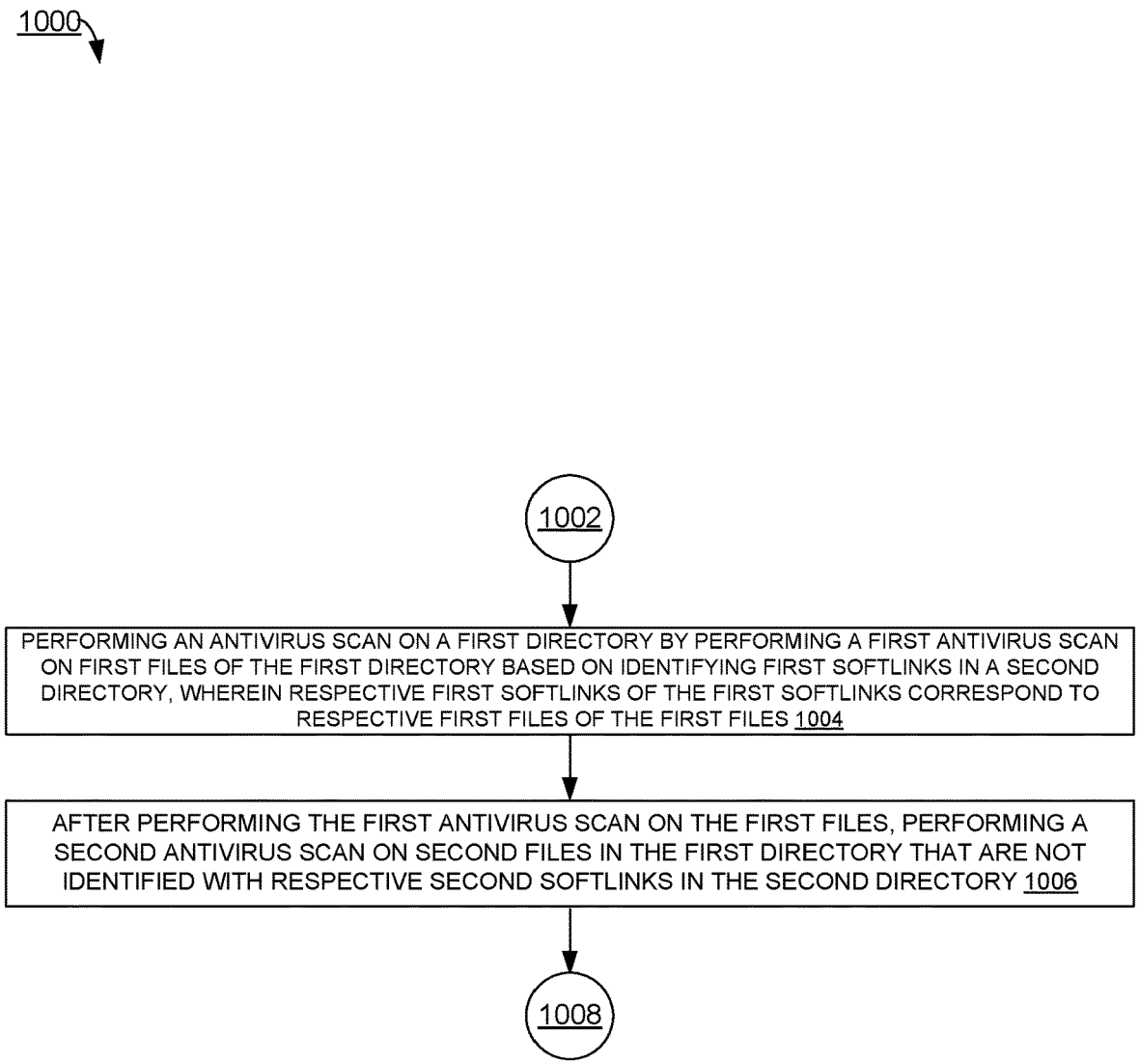
FIG. 10 illustrates another example process flow that can facilitate prioritized virus scanning of files based on file size, in accordance with an embodiment of this disclosure.

Each of server 102 and/or client computer 106 can be implemented with part(s) of computing environment 1000 of FIG. 10. Communications network 104 can comprise a computer communications network, such as the Internet.

Client computer 106 can contact server 102 to request performing a file system operation (e.g., read or write) on a file of file system 110 (which can store computer data as files). This request can be received by protocol driver 116, which can be configured to perform file system operations on file system 110.

Where protocol driver 116 performs a file system operation, prioritized virus scanning of files based on file size component 108 can analyze the corresponding file (such as based on a completion callback of protocol driver 116, to determine whether the file should be prioritized for virus scanning because it is the appropriate size (e.g., smaller than 1 MB). Where the file is the appropriate size, prioritized virus scanning of files based on file size component 108 can add a softlink of the file to softlink directory 114 (in cases where such a softlink does not already exist).

Similarly, in cases where there is a softlink for the file in softlink directory 114, but the file is now the wrong size for prioritized virus scanning (e.g., it has been modified to now by larger than 1 MB), then prioritized virus scanning of files based on file size component 108 can remove the softlink of the file from softlink directory 114.

When antivirus scanning component 118 of FIG. 1 performs antivirus scanning for a directory (e.g., for directory 112), it can first scan those files identified in softlink directory 114, and after completing scanning those priority files, then scan other files of directory 112.

In some examples, prioritized virus scanning of files based on file size component 108 can implement part(s) of the process flows of FIGS. 4-10 to implement prioritized virus scanning of files based on file size.

It can be appreciated that system architecture 100 is one example system architecture for prioritized virus scanning of files based on file size, and that there can be other system architectures that facilitate prioritized virus scanning of files based on file size.

Figure 2:
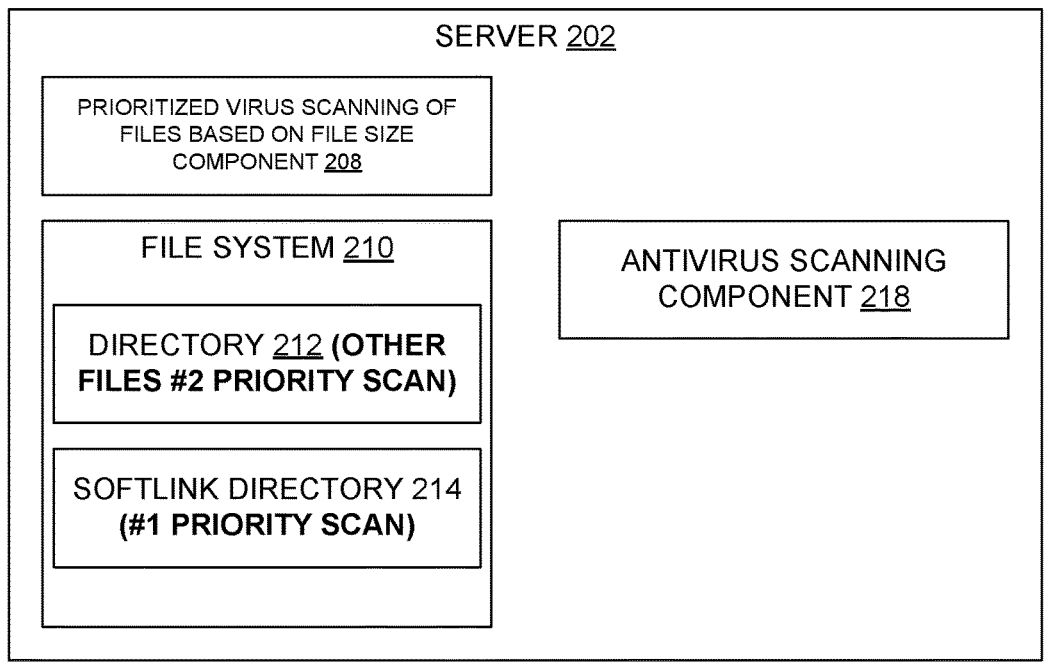
FIG. 2 illustrates another example system architecture that can facilitate prioritized virus scanning of files based on file size, in accordance with an embodiment of this disclosure.

FIG. 2 illustrates another example system architecture that can facilitate prioritized virus scanning of files based on file size, in accordance with an embodiment of this disclosure. In some examples, part(s) of system architecture 200 can be used to implement part(s) of system architecture 100 of FIG. 1.

System architecture 200 comprises server 202, prioritized virus scanning of files based on file size component 208, directory 212, softlink directory 214, and antivirus scanning component 218, which can be similar to server 102, prioritized virus scanning of files based on file size component 108, directory 112, softlink directory 114, and antivirus scanning component 118 of FIG. 1, respectively.

In effectuating prioritized virus scanning of files based on file size, prioritized virus scanning of files based on file size component 308 can first scan files linked by softlinks in softlink directory 214, and then scan remaining files (that is, files that were not linked by softlinks in softlink directory 214) in directory 212.

Figure 3:
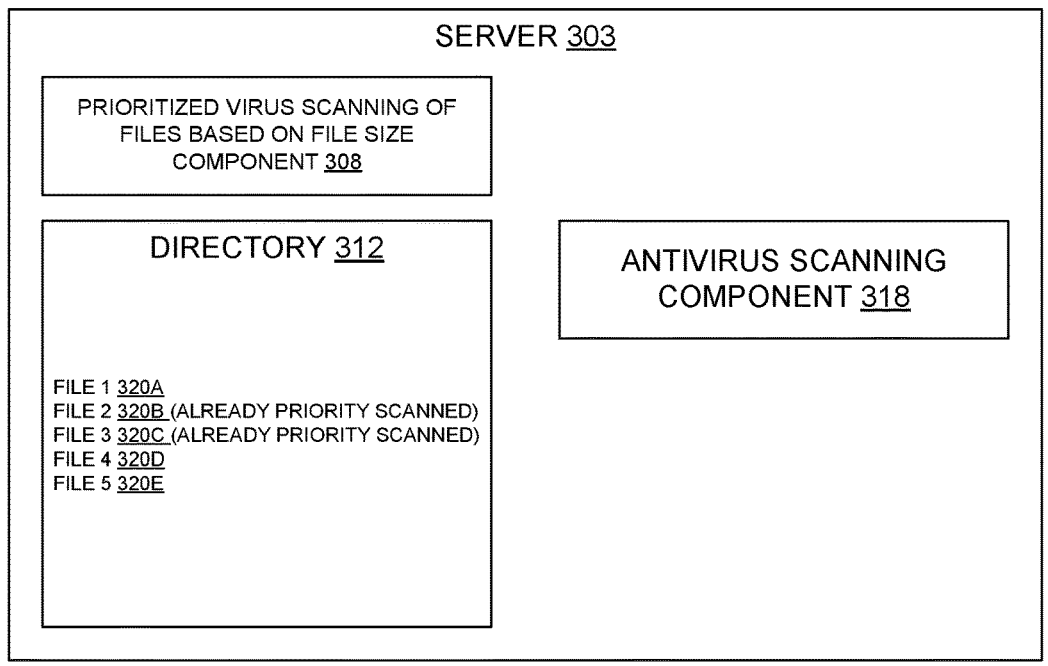
FIG. 3 illustrates an example system architecture for tree-walking files in a directory, and that can facilitate prioritized virus scanning of files based on file size, in accordance with an embodiment of this disclosure.

FIG. 3 illustrates an example system architecture for tree-walking files in a directory, and that can facilitate prioritized virus scanning of files based on file size, in accordance with an embodiment of this disclosure. In some examples, part(s) of system architecture 200 can be used to implement part(s) of system architecture 100 of FIG. 1.

System architecture 300 comprises prioritized virus scanning of files based on file size component 308, directory 312, and antivirus scanning component 318, which can be similar to prioritized virus scanning of files based on file size component 108, directory 112, and antivirus scanning component 118 of FIG. 1, respectively. In turn, directory 312 comprises file 1 320A, file 2 320B, file 3 320C, file 4 320D, and file 5 320E.

As part of effectuating prioritized virus scanning of files based on file size, prioritized virus scanning of files based on file size component 308 can first scan priority files, and then scan non-priority files, as depicted in FIG. 3. Here, file 2 320B and file 3 320C can be priority files, so have already been scanned (such as when scanning files associated with softlink directory 214 of FIG. 2).

When prioritized virus scanning of files based on file size component 308 performs a tree-walk of files in directory 312, and encounters file 2 320B and file 3 320C, it can skip over scanning file 2 320B and file 3 320C again. One way prioritized virus scanning of files based on file size component 308 can do this is by comparing a last-scanned time of a file with its last-modified time. Where file 2 320B and file 3 320C have recently been scanned, it can be that their last-scanned time is more recent than their last-modified time, and prioritized virus scanning of files based on file size component 308 can use this information to determine not to scan these files as part of tree-walking directory 312.

Instead, prioritized virus scanning of files based on file size component 308 can scan file 1 320A, file 4 320D, and file 5 320E as part of scanning files of directory 312 as part of performing prioritized virus scanning of files based on file size.

Example Process Flows

FIG. 4 illustrates an example process flow for processing a modified file that has a suitable file size and lacks a softlink, and that can facilitate prioritized virus scanning of files based on file size, in accordance with an embodiment of this disclosure. In some examples, one or more embodiments of process flow 400 can be implemented by prioritized virus scanning of files based on file size component 108 of FIG. 1, or computing environment 1000 of FIG. 10.

It can be appreciated that the operating procedures of process flow 400 are example operating procedures, and that there can be embodiments that implement more or fewer operating procedures than are depicted, or that implement the depicted operating procedures in a different order than as depicted. In some examples, process flow 400 can be implemented in conjunction with one or more embodiments of one or more of process flow 500 of FIG. 5, process flow 600 of FIG. 6, process flow 700 of FIG. 7, process flow 800 of FIG. 8, process flow 900 of FIG. 9, and/or process flow 1000 of FIG. 10.

Process flow 400 begins with 402, and moves to operation 404.

Operation 404 depicts determining that a file operation was performed on a file. This can be an operation to modify a file, where the modification can affect the file's size.

After operation 404, process flow 400 moves to operation 406.

Operation 406 depicts determining that there is not a softlink for the file. Using the example of FIG. 1, this can be a softlink for the file stored in softlink directory 114, and can be determined by examining the softlinks in softlink directory 114.

After operation 406, process flow 400 moves to operation 408.

Operation 408 depicts determining that the file has a priority size. In some examples, this can be files that have a size below a threshold value (e.g., smaller than 1 MB), or files within a specified range (e.g., 200-500 KB). This can be performed via running a stats command with respect to the file to determine its size, and comparing that size against threshold values or ranges for priority virus scanning.

After operation 408, process flow 400 moves to operation 410.

Operation 410 depicts adding a softlink for the file. This can comprise a softlink added to softlink directory 114 of FIG. 1, such that, when antivirus scanning is performed, that file will be scanned before non-priority files in directory 112 are scanned.

In this manner, where a file is modified, there is no softlink for the file, and the file is an appropriate size, a softlink for the file can be added for priority virus scanning.

After operation 410, process flow 400 moves to 412, where process flow 400 ends.

FIG. 5 illustrates an example process flow for processing a modified file that has an unsuitable file size and lacks a softlink, and that can facilitate prioritized virus scanning of files based on file size, in accordance with an embodiment of this disclosure. In some examples, one or more embodiments of process flow 500 can be implemented by prioritized virus scanning of files based on file size component 108 of FIG. 1, or computing environment 1000 of FIG. 10.

It can be appreciated that the operating procedures of process flow 500 are example operating procedures, and that there can be embodiments that implement more or fewer operating procedures than are depicted, or that implement the depicted operating procedures in a different order than as depicted. In some examples, process flow 500 can be implemented in conjunction with one or more embodiments of one or more of process flow 400 of FIG. 4, process flow 600 of FIG. 6, process flow 700 of FIG. 7, process flow 800 of FIG. 8, process flow 900 of FIG. 9, and/or process flow 1000 of FIG. 10.

Process flow 500 begins with 502, and moves to operation 504.

Operation 504 depicts determining that a file operation was performed on a file. In some examples, operation 504 can be implemented in a similar manner as operation 404 of FIG. 4.

After operation 504, process flow 500 moves to operation 506.

Operation 506 depicts determining that there is not a softlink for the file. In some examples, operation 506 can be implemented in a similar manner as operation 406 of FIG. 4.

After operation 506, process flow 500 moves to operation 508.

Operation 508 depicts determining that the file does not have a priority size. In some examples, this can be files that do not have a size below a threshold value (e.g., smaller than 1 MB), or files outside of a specified range (e.g., 200-500 KB). This can be performed via running a stats command with respect to the file to determine its size, and comparing that size against threshold values or ranges for priority virus scanning.

After operation 508, process flow 500 moves to operation 510.

Operation 510 depicts determining not to add a softlink for the file. Using the example of FIG. 1, even though a softlink for the file does not exist in softlink directory 114, such a softlink is not added to the directory, because the file has been determined not to be a priority file for antivirus scanning based on its size.

In this manner, where a file is modified, and there is no softlink for the file, but the file is not an appropriate size, it can be that no softlink for the file can is added for priority virus scanning.

After operation 510, process flow 500 moves to 512, where process flow 500 ends.

FIG. 6 illustrates an example process flow for processing a modified file that has an unsuitable file size and has a softlink, and that can facilitate prioritized virus scanning of files based on file size, in accordance with an embodiment of this disclosure. In some examples, one or more embodiments of process flow 600 can be implemented by prioritized virus scanning of files based on file size component 108 of FIG. 1, or computing environment 1000 of FIG. 10.

It can be appreciated that the operating procedures of process flow 600 are example operating procedures, and that there can be embodiments that implement more or fewer operating procedures than are depicted, or that implement the depicted operating procedures in a different order than as depicted. In some examples, process flow 600 can be implemented in conjunction with one or more embodiments of one or more of process flow 400 of FIG. 4, process flow 500 of FIG. 5, process flow 700 of FIG. 7, process flow 800 of FIG. 8, process flow 900 of FIG. 9, and/or process flow 1000 of FIG. 10.

Process flow 600 begins with 602, and moves to operation 604.

Operation 604 depicts determining that a file operation was performed on a file. In some examples, operation 604 can be implemented in a similar manner as operation 404 of FIG. 4.

After operation 604, process flow 600 moves to operation 606.

Operation 606 depicts determining that there is a softlink for the file. Using the example of FIG. 1, this can be a softlink for the file stored in softlink directory 114, and can be determined by examining the softlinks in softlink directory 114 to identify a softlink that references the file of operation 604.

After operation 606, process flow 600 moves to operation 608.

Operation 608 depicts determining that the file does not have a priority size.

In some examples, operation 608 can be implemented in a similar manner as operation 508 of FIG. 5.

After operation 608, process flow 600 moves to operation 610.

Operation 610 depicts removing a softlink for the file. Using the example of FIG. 1, in the past, a softlink for the file was added to softlink directory 114 because, at the time, the file had an appropriate size. But now the file has been modified and its size changed to no longer be a priority size, so the softlink to the file is removed.

In this manner, where a file is modified, and there is a softlink for the file, but the file is no longer an appropriate size, it can be that the softlink for the file is removed from priority virus scanning.

After operation 610, process flow 600 moves to 612, where process flow 600 ends.

Figure 7:
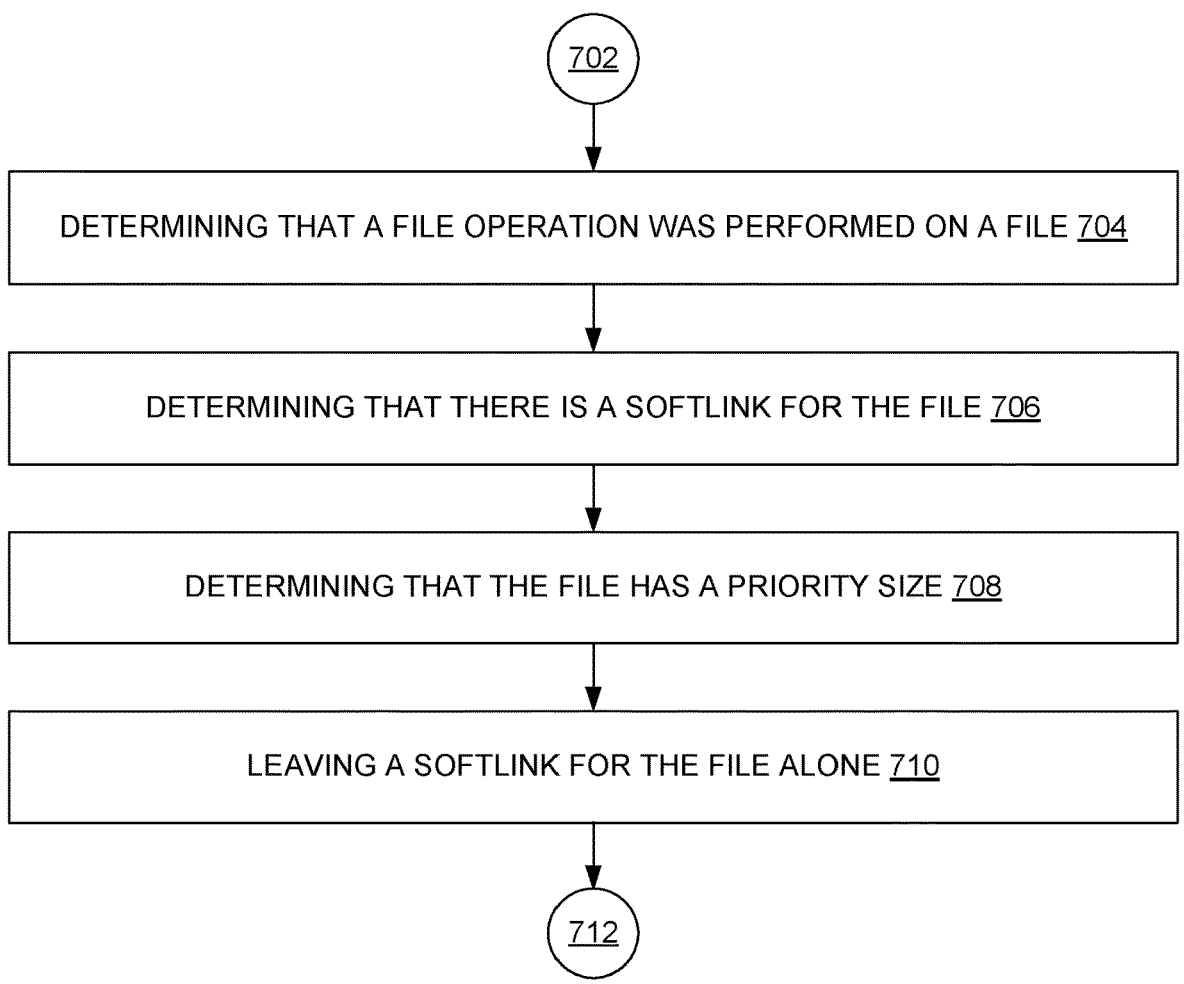
FIG. 7 illustrates an example process flow for processing a modified file that has a suitable file size and has a softlink, and that can facilitate prioritized virus scanning of files based on file size, in accordance with an embodiment of this disclosure.

FIG. 7 illustrates an example process flow for processing a modified file that has a suitable file size and has a softlink, and that can facilitate prioritized virus scanning of files based on file size, in accordance with an embodiment of this disclosure. In some examples, one or more embodiments of process flow 700 can be implemented by prioritized virus scanning of files based on file size component 108 of FIG. 1, or computing environment 1000 of FIG. 10.

It can be appreciated that the operating procedures of process flow 700 are example operating procedures, and that there can be embodiments that implement more or fewer operating procedures than are depicted, or that implement the depicted operating procedures in a different order than as depicted. In some examples, process flow 700 can be implemented in conjunction with one or more embodiments of one or more of process flow 400 of FIG. 4, process flow 500 of FIG. 5, process flow 600 of FIG. 6, process flow 800 of FIG. 8, process flow 900 of FIG. 9, and/or process flow 1000 of FIG. 10.

Process flow 700 begins with 702, and moves to operation 704.

Operation 704 depicts determining that a file operation was performed on a file. In some examples, operation 704 can be implemented in a similar manner as operation 404 of FIG. 4.

After operation 704, process flow 700 moves to operation 706.

Operation 706 depicts determining that there is a softlink for the file. In some examples, operation 706 can be implemented in a similar manner as operation 606 of FIG. 6.

After operation 706, process flow 700 moves to operation 708.

Operation 708 depicts determining that the file has a priority size. In some examples, operation 708 can be implemented in a similar manner as operation 408 of FIG. 4.

After operation 708, process flow 700 moves to operation 710.

Operation 710 depicts leaving a softlink for the file alone. Using the example of FIG. 1, there is a softlink for the file in softlink directory 114, and no action is taken with regard to modifying that in operation 710.

In this manner, where a file is modified, there is a softlink for the file, and the file remains an appropriate size, it can be that the softlink for the file is maintained for priority virus scanning.

After operation 710, process flow 700 moves to 712, where process flow 700 ends.

FIG. 8 illustrates an example process flow that can facilitate prioritized virus scanning of files based on file size, in accordance with an embodiment of this disclosure. In some examples, one or more embodiments of process flow 800 can be implemented by prioritized virus scanning of files based on file size component 108 of FIG. 1, or computing environment 1000 of FIG. 10.

It can be appreciated that the operating procedures of process flow 800 are example operating procedures, and that there can be embodiments that implement more or fewer operating procedures than are depicted, or that implement the depicted operating procedures in a different order than as depicted. In some examples, process flow 800 can be implemented in conjunction with one or more embodiments of one or more of process flow 400 of FIG. 4, process flow 500 of FIG. 5, process flow 600 of FIG. 6, process flow 700 of FIG. 7, process flow 900 of FIG. 9, and/or process flow 1000 of FIG. 10.

Process flow 800 begins with 802, and moves to operation 804.

Operation 804 depicts maintaining, in a directory, respective first softlinks of respective first files that have a size within a specified range, and that have been modified subsequent to a respective most-recent virus scan. That is, a directory can be maintained of softlinks of files to AV scan first (where those files satisfy a size metric). This directory can be similar to softlink directory 114 of FIG. 1.

In some examples, operation 804 comprises, in response to determining that a file-close operation for a file has succeeded, and in response to determining that the file has a first size within the specified range, creating a softlink for the file in the directory. That is, softlink creation for a file can occur once a corresponding file-close operation succeeds. In some examples, the file-close operation corresponds to closing the file after the file has been modified. That is, the operation can be a modify-and-close (where the modify can affect the file's size, causing it to be added to, or removed from, the softlinks). In some examples, determining that the file-close operation for the file has succeeded is based on identifying a completion callback from a protocol driver that performed the file-close operation. That is, this can be determined based on a completion callback from a protocol driver, which can be similar to protocol driver 116 of FIG. 1.

After operation 804, process flow 800 moves to operation 806.

Operation 806 depicts, in response to determining to perform an antivirus scan on a group of files that comprises the first files, performing a first antivirus scan on the first files based on identifying the first softlinks in the directory, and after performing the first antivirus scan on the first files, performing a second antivirus scan on second files of the group of files that are not identified with respective second softlinks in the directory. Using the example of FIG. 1, this can comprise scanning the files identified in softlink directory 114 first, and then scanning other files in directory 112.

In some examples, the directory is a first directory, determining to perform the antivirus scan comprises determining to perform the antivirus scan on a second directory, and performing the second antivirus scan on the second files of the group of files comprises identifying the second files based on performing tree-walk of the second directory. Continuing with the example of FIG. 1, files in directory 112 can be identified for scanning by tree walking directory 112 (where a tree walk can be an approach for traversing a file system directory structure and examining each file in the directory structure).

In some examples, identifying the second files based on performing the tree-walk of the second directory comprises refraining from including the first files in the identifying of the second files based on determining that respective first files of the first files have last been antivirus scanned more recently than they have last been modified. In some examples, the determining that the respective first files of the first files have last been antivirus scanned more recently than they have last been modified is based on maintaining respective last-scanned times for the respective first files, and maintaining respective last-modified times for the respective first files. That is, last-scanned and last-modified metadata can be maintained for each file, and this metadata can be used to determine that the first files have already been scanned in this instance of scanning.

After operation 806, process flow 800 moves to 808, where process flow 800 ends.

Figure 9:
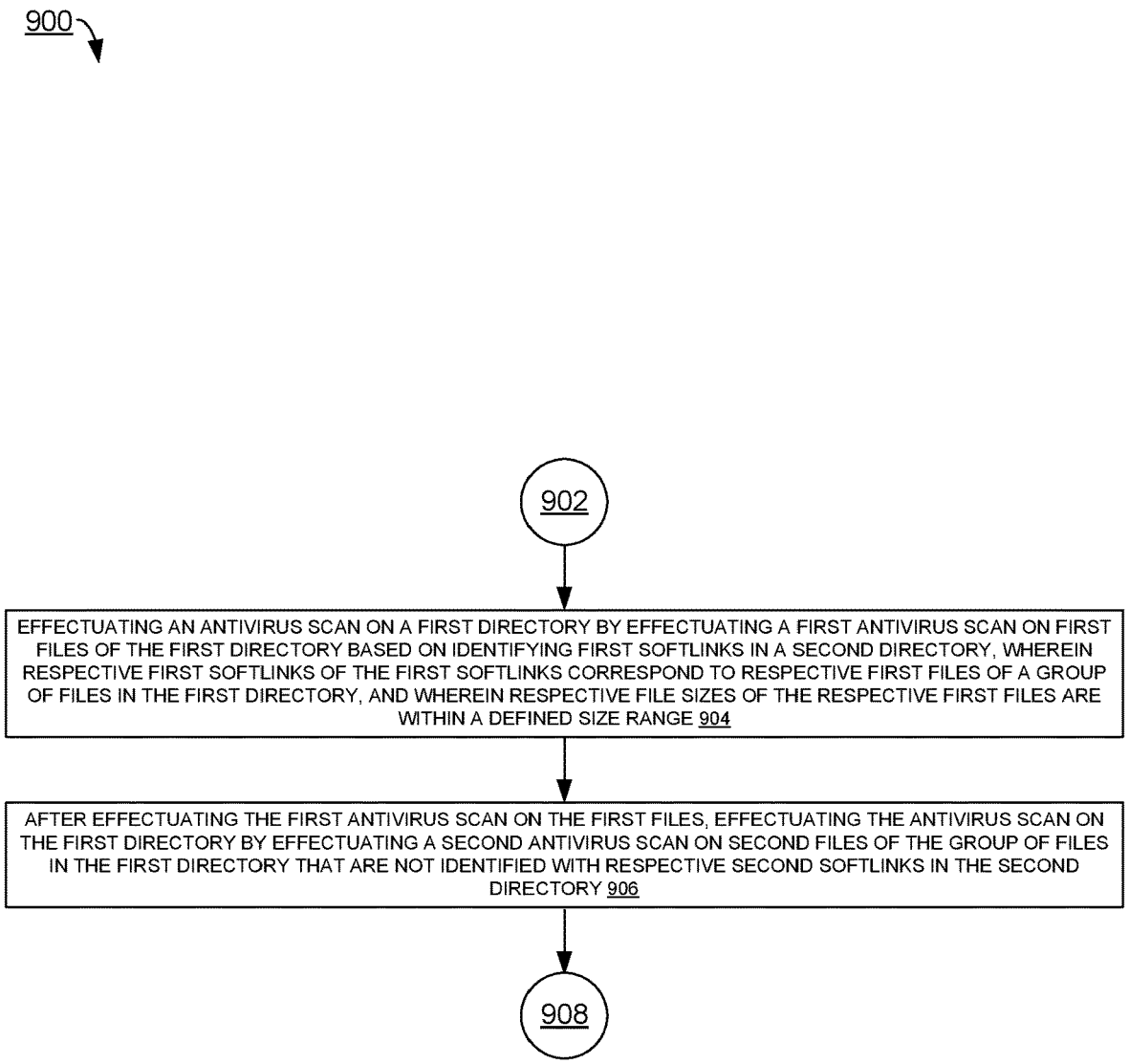
FIG. 9 illustrates another example process flow that can facilitate prioritized virus scanning of files based on file size, in accordance with an embodiment of this disclosure.

FIG. 9 illustrates another example process flow that can facilitate prioritized virus scanning of files based on file size, in accordance with an embodiment of this disclosure. In some examples, one or more embodiments of process flow 900 can be implemented by prioritized virus scanning of files based on file size component 108 of FIG. 1, or computing environment 1000 of FIG. 10.

It can be appreciated that the operating procedures of process flow 900 are example operating procedures, and that there can be embodiments that implement more or fewer operating procedures than are depicted, or that implement the depicted operating procedures in a different order than as depicted. In some examples, process flow 900 can be implemented in conjunction with one or more embodiments of one or more of process flow 400 of FIG. 4, process flow 500 of FIG. 5, process flow 600 of FIG. 6, process flow 700 of FIG. 7, process flow 800 of FIG. 8, and/or process flow 1000 of FIG. 10.

Process flow 900 begins with 902, and moves to operation 904.

Operation 904 depicts effectuating an antivirus scan on a first directory by effectuating a first antivirus scan on first files of the first directory based on identifying first softlinks in a second directory, wherein respective first softlinks of the first softlinks correspond to respective first files of a group of files in the first directory, and wherein respective file sizes of the respective first files are within a defined size range. In some examples, operation 904 can be implemented in a similar manner as operation 804, and parts of operation 806 (as they apply to performing a first antivirus scan on the first files), of FIG. 8.

In some examples, effectuating the first antivirus scan on the first files of the first directory based on identifying the first softlinks in the second directory comprises removing respective members of the first softlinks based on scanning respective first files of the first files. That is, softlinks for files in directory 112 of FIG. 1 can be removed from softlink directory 114 of FIG. 1 as they are scanned (because it can be that those files do not need to be scanned again unless they are modified, and the modification operation can result in new softlinks being created for those files in softlink directory 114).

In some examples, operation 904 comprises, in response to determining that a file-close operation for a file has succeeded, in response to determining that a file size of the file is outside of the defined size range, and in response to determining that a first softlink of the first softlinks corresponds to the file, removing the first softlink from the second directory. That is, if a file has a softlink, then has been modified and now has a size outside of the range for which softlinks are created, the softlink can be removed (since the file now no longer receives priority antivirus scanning).

In some examples, determining that the file size of the file is outside of the defined size range comprises performing a stats command regarding the file. This can be similar to a stats command in a UNIX-type operating system, where a result of this command identifies a size of the file.

In some examples, operation 904 comprises, in response to determining that a file-close operation for a file has succeeded, in response to determining that a file size of the file is outside of the defined size range, refraining from creating a softlink that corresponds to the file in the second directory. That is, if a file lacks a softlink, and has been modified to still have a size outside of the range for which softlinks are created, it can be that no action is taken with regard to a softlink for the file (e.g., one is not created for the file).

In some examples, operation 904 comprises, in response to determining to add a first softlink for a first file to the second directory, enqueuing a work item to a message queue, wherein the work item identifies the first file. That is, a message queue architecture can be implemented to effectuate softlink management.

After operation 904, process flow 900 moves to operation 906.

Operation 906 depicts, after effectuating the first antivirus scan on the first files, effectuating the antivirus scan on the first directory by effectuating a second antivirus scan on second files of the group of files in the first directory that are not identified with respective second softlinks in the second directory. In some examples, operation 906 can be implemented in a similar manner as parts of operation 806 of FIG. 8, as they apply to performing a second antivirus scan on second files.

In some examples, effectuating the second antivirus scan on the second files of the group of files in the first directory that are not identified with the respective second softlinks in the second directory comprises tree-walking the first directory to identify candidate files, and identifying that a candidate file of the candidate files is a member of the second files based on the candidate file not having been scanned since the candidate file was modified.

After operation 906, process flow 900 moves to 908, where process flow 900 ends.

FIG. 10 illustrates another example process flow that can facilitate prioritized virus scanning of files based on file size, in accordance with an embodiment of this disclosure. In some examples, one or more embodiments of process flow 1000 can be implemented by prioritized virus scanning of files based on file size component 108 of FIG. 1, or computing environment 1000 of FIG. 10.

It can be appreciated that the operating procedures of process flow 1000 are example operating procedures, and that there can be embodiments that implement more or fewer operating procedures than are depicted, or that implement the depicted operating procedures in a different order than as depicted. In some examples, process flow 1000 can be implemented in conjunction with one or more embodiments of one or more of process flow 400 of FIG. 4, process flow 500 of FIG. 5, process flow 600 of FIG. 6, process flow 700 of FIG. 7, process flow 800 of FIG. 8, and/or process flow 900 of FIG. 9.

Process flow 1000 begins with 1002, and moves to operation 1004.

Operation 1004 depicts performing an antivirus scan on a first directory by performing a first antivirus scan on first files of the first directory based on identifying first softlinks in a second directory, wherein respective first softlinks of the first softlinks correspond to respective first files of the first files. In some examples, operation 1004 can be implemented in a similar manner as operation 904 of FIG. 9.

In some examples, respective file sizes of the respective first files are within a defined size range.

In some examples, the defined size range indicates a size below a threshold size value. That is, the criterion for priority virus scanning can be files smaller than a particular size.

In some examples, operation 904 comprises determining the defined size range based on receiving user input indicative of user size range data. That is, the criterion for priority virus scanning can be user defined.

In some examples, there is a default defined size range value for the defined size range, and operation 904 comprises replacing the default defined size range value for the defined size range based on the user size range data. That is, there can be a default criterion for priority virus scanning that a user can override.

In some examples, operation 904 comprises determining the defined size range based on determining that the defined size range is associated with files that are infected with viruses. That is, the criterion for priority virus scanning can be determined based on typical sizes of infected files.

After operation 1004, process flow 1000 moves to operation 1006.

Operation 1006 depicts, after performing the first antivirus scan on the first files, performing a second antivirus scan on second files in the first directory that are not identified with respective second softlinks in the second directory. In some examples, operation 1006 can be implemented in a similar manner as operation 906 of FIG. 9.

After operation 1006, process flow 1000 moves to 1008, where process flow 1000 ends.

Example Operating Environment

Figure 11:
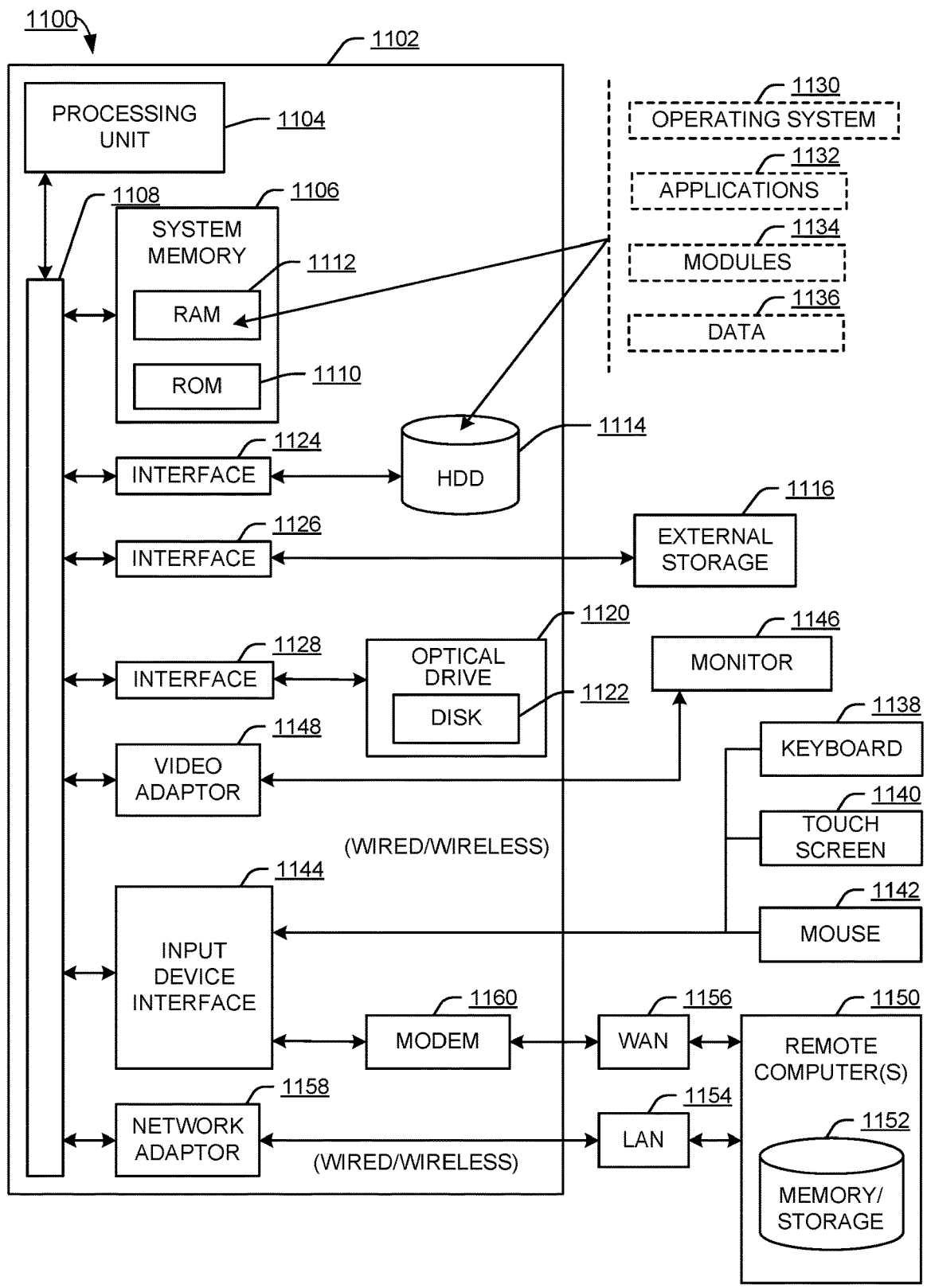
FIG. 11 illustrates an example block diagram of a computer operable to execute an embodiment of this disclosure.

In order to provide additional context for various embodiments described herein, FIG. 11 and the following discussion are intended to provide a brief, general description of a suitable computing environment 1100 in which the various embodiments of the embodiment described herein can be implemented.

For example, parts of computing environment 1100 can be used to implement one or more embodiments of server 102 and/or client computer 106 of FIG. 1.

In some examples, computing environment 1100 can implement one or more embodiments of the process flows of FIGS. 4 and/or 9-11 to facilitate prioritized recovery of files during failback.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a nonvolatile storage such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), one or more external storage devices 1116 (e.g., a magnetic floppy disk drive (FDD) 1116, a memory stick or flash drive reader, a memory card reader, etc.) and an optical disk drive 1120 (e.g., which can read or write from a CD-ROM disc, a DVD, a BD, etc.). While the internal HDD 1114 is illustrated as located within the computer 1102, the internal HDD 1114 can also be configured for external use in a suitable chassis (not shown). Additionally, while not shown in environment 1100, a solid state drive (SSD) could be used in addition to, or in place of, an HDD 1114. The HDD 1114, external storage device(s) 1116 and optical disk drive 1120 can be connected to the system bus 1108 by an HDD interface 1124, an external storage interface 1126 and an optical drive interface 1128, respectively. The interface 1124 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1394 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the Internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are examples, and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "datastore," "data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or application programming interface (API) components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   a processor; and
   a memory that stores executable instructions that, when executed by the processor, facilitate performance of operations, comprising:
      maintaining, in a directory, respective first softlinks of respective first files that have a size within a specified range, and that have been modified subsequent to a respective most-recent virus scan; and
      in response to determining to perform an antivirus scan on a group of files that comprises the first files,
         performing a first antivirus scan on the first files based on identifying the first softlinks in the directory, and
         after performing the first antivirus scan on the first files, performing a second antivirus scan on second files of the group of files that are not identified with respective second softlinks in the directory.

2. The system of claim 1, wherein the directory is a first directory, wherein determining to perform the antivirus scan comprises determining to perform the antivirus scan on a second directory, and wherein performing the second antivirus scan on the second files of the group of files comprises:
   identifying the second files based on performing tree-walk of the second directory.

3. The system of claim 2, wherein identifying the second files based on performing the tree-walk of the second directory comprises:
   refraining from including the first files in the identifying of the second files based on determining that respective first files of the first files have last been antivirus scanned more recently than they have last been modified.

4. The system of claim 1, wherein the determining that the respective first files of the first files have last been antivirus scanned more recently than they have last been modified is based on maintaining respective last-scanned times for the respective first files, and maintaining respective last-modified times for the respective first files.

5. The system of claim 1, wherein the operations further comprise:
   in response to determining that a file-close operation for a file has succeeded, and in response to determining that the file has a first size within the specified range, creating a softlink for the file in the directory.

6. The system of claim 5, wherein the file-close operation corresponds to closing the file after the file has been modified.

7. The system of claim 5, wherein the determining that the file-close operation for the file has succeeded is based on identifying a completion callback from a protocol driver that performed the file-close operation.

8. A method, comprising:
effectuating, by a system comprising a processor, an antivirus scan on a first directory by effectuating a first antivirus scan on first files of the first directory based on identifying first softlinks in a second directory, wherein respective first softlinks of the first softlinks correspond to respective first files of a group of files in the first directory, and wherein respective file sizes of the respective first files are within a defined size range; and
after effectuating the first antivirus scan on the first files, effectuating the antivirus scan on the first directory by effectuating a second antivirus scan on second files of the group of files in the first directory that are not identified with respective second softlinks in the second directory.

9. The method of claim 8, wherein effectuating the first antivirus scan on the first files of the first directory based on identifying the first softlinks in the second directory comprises:
removing, by the system, respective members of the first softlinks based on scanning respective first files of the first files.

10. The method of claim 8, further comprising:
in response to determining that a file-close operation for a file has succeeded, in response to determining that a file size of the file is outside of the defined size range, and in response to determining that a first softlink of the first softlinks corresponds to the file, removing, by the system, the first softlink from the second directory.

11. The method of claim 10, wherein the determining that the file size of the file is outside of the defined size range comprises:
performing, by the system, a stats command regarding the file.

12. The method of claim 8, further comprising:
in response to determining that a file-close operation for a file has succeeded, in response to determining that a file size of the file is outside of the defined size range, refraining from creating a softlink that corresponds to the file in the second directory.

13. The method of claim 8, further comprising:
in response to determining to add a first softlink for a first file to the second directory, enqueuing, by the system, a work item to a message queue, wherein the work item identifies the first file.

14. The method of claim 8, wherein effectuating the second antivirus scan on the second files of the group of files in the first directory that are not identified with the respective second softlinks in the second directory comprises:
tree-walking, by the system, the first directory to identify candidate files; and
identifying, by the system, that a candidate file of the candidate files is a member of the second files based on the candidate file not having been scanned since the candidate file was modified.

15. A non-transitory computer-readable medium comprising instructions that, in response to execution, cause a system comprising a processor to perform operations, comprising:
performing an antivirus scan on a first directory by performing a first antivirus scan on first files of the first directory based on identifying first softlinks in a second directory, wherein respective first softlinks of the first softlinks correspond to respective first files of the first files; and
after performing the first antivirus scan on the first files, performing a second antivirus scan on second files in the first directory that are not identified with respective second softlinks in the second directory.

16. The non-transitory computer-readable medium of claim 15, wherein respective file sizes of the respective first files are within a defined size range.

17. The non-transitory computer-readable medium of claim 16, wherein the defined size range indicates a size below a threshold size value.

18. The non-transitory computer-readable medium of claim 16, wherein the operations further comprise:
determining the defined size range based on receiving user input indicative of user size range data.

19. The non-transitory computer-readable medium of claim 18, wherein there is a default defined size range value for the defined size range, and wherein the operations further comprise:
replacing the default defined size range value for the defined size range based on the user size range data.

20. The non-transitory computer-readable medium of claim 16, wherein the operations further comprise:
determining the defined size range based on determining that the defined size range is associated with files that are infected with viruses.

* * * * *